United States Patent [19]
Helmschrott et al.

[11] 3,855,599
[45] Dec. 17, 1974

[54] APPARATUS FOR RECORDING OPERATIONAL CONDITIONS OF A MOTOR CAR

[75] Inventors: Norbert Helmschrott, Schwenningen; Heinz Kelch, Buchenberg; Eduard Schuh, Villingen; Hans Zimmermann, Schwenningen, all of Germany

[73] Assignee: Kienzle Apparate GmbH, Villingen Schwarzwald, Germany

[22] Filed: Sept. 24, 1973

[21] Appl. No.: 400,320

[30] Foreign Application Priority Data
Oct. 11, 1972  Germany.......................... 22496282

[52] U.S. Cl.................................. 346/62, 346/123
[51] Int. Cl.............................................. G01d 9/32
[58] Field of Search......... 346/62, 63, 64, 121, 122, 346/123, 7

[56] References Cited
UNITED STATES PATENTS

| | | | |
|---|---|---|---|
| 3,000,687 | 9/1961 | Haupt | 346/64 X |
| 3,132,916 | 5/1964 | Muller | 346/62 |
| 3,521,291 | 7/1970 | Helmschrott et al. | 346/123 X |
| 3,624,660 | 11/1971 | Fichter | 346/62 X |

*Primary Examiner*—Joseph W. Hartary
*Attorney, Agent, or Firm*—Michael Striker

[57] ABSTRACT

An apparatus for automatically recording time periods during which the motor car stands still and is driven, respectively, includes a transmission having a constant speed input, and a varying speed input driven by a device for measuring the distance of travel of the car, and a control gear and control cam for shifting a recording arm to a first recording position when the car is at a standstill, and to a second recording position when the car is driven so that distinguishable graphs are recorded. The graph representing the driven condition of the car is preferably a zig-zag line. The transmission preferably includes an inner thread in the control gear, and a projecting stud on a shaft driven by the variable input and meshing with the inner thread.

18 Claims, 8 Drawing Figures

APPARATUS FOR RECORDING OPERATIONAL CONDITIONS OF A MOTOR CAR

BACKGROUND OF THE INVENTION

The present invention relates to recording apparatus capable of making distinguishable graphs for representing time periods during which the car is operated in different conditions, such as standstill and drive.

It is known to record operational time periods of a car, and thereby also working times and on duty times of a driver, together with other data concerning the car, such as speed, number of revolutions of the motor, the traveled distance, and the consumption of fuel and so forth. The recordings are made in the form of stepped lines, which are preferably zig-zag lines forming a wide recorded graph which is evaluated in automatic read-out apparatus. When several drivers are assigned to the same car or truck, it is usual that each driver of the crew is associated with a recording apparatus for recording time periods when the car is driven, the time periods of readiness during which the respective driver rides in the car without steering, and the other driver steers, the time periods during which loading and unloading takes place, and rest periods. Since in many cases, the graphs or diagrams constitute the basis for the wage calculation for the driver, the quality of the recordings must be very high, and on the other hand, time periods, such as driving and steering time, must not be lost due to errors of the driver such as wrong presetting of the steering time, which is to be registered. Particularly, manipulations by which maximal steering times prescribed by law are incorrectly recorded, should be prevented.

It is therefore advisable to construct the recording apparatus for recording working times in such a manner, that the recording of the actual driving and steering time is automatically recorded at the start of the movement of the car and when the car again stops, independently of the manual setting of the apparatus by the driver regarding a rest period, working time, time of readiness, and steering time.

Such an arrangement can be obtained in a simple manner by providing a vibratory pendulum for oscillating the recording arm transversely to the recording direction of the record carrier, so that zig-zag lines form a wide beam-shaped graph. A particular advantage of the vibratory pendulum, which is mainly actuated by uneven portions of the road surface or by transverse acceleration in a curve, resides in that the vibratory pendulum produces a criterion regarding the condition and movement of the car even if the electric current of the recording apparatus is interrupted, or when the drive shaft breaks. It is, however, a disadvantage that during the time period when the car is at a standstill, there is no drive provided for the respective recording means, and that on good roads, the drive energy is insufficient for the vibratory pendulum to obtain a satisfactory zig-zag graph recording. For working a time of the driver, which takes place during standstill of the car, only stepped lines form the graphs unless additional apparatus is provided to oscillate the recording means during times when the vibratory pendulum is inoperative. Narrow graphs in the form of stepped lines are very unsuitable for automatic evaluations by read-out apparatus which is required for the calculation of the wages of the driver.

Accordingly, it has been proposed to used for the drive of recording means for the working time, devices controlled by heated wires, or electric pulse generators which cooperate with suitable electromagnets. Such apparatus permits it to record zig-zag graphs for all operational conditions of the car, but such zig-zag graphs cannot be used exclusively for representing the steering time.

Devices controlled by heated wires require to much space, and the recording frequency is very temperature dependent. Furthermore, due to fatique, the devices have a short span of life, and require frequent adjustment.

Electromagnetic devices operated by a pulse generator are less delicate, but are expensive and require a great deal of space.

Some of the disadvantages of this type of recording means are overcome by the apparatus disclosed in the German Pat. No. 1,915,917 in which several coils influence a turnable armature whose shaft carries a cam controlling one or several recording arms, but a disadvantage of high temperature, common to all electromagnetic devices, remains, particularly due to the compact construction of recording devices for cars and trucks.

An apparatus in which a recording means is automatically shifted is disclosed in the German OS 1,774,530. In this device, an electromagnet is energized by a switch automatically actuated in accordance with the drive condition of the car, so that a zig-zag graph representing the driving time is obtained. In such an arrangement, a switch operated in accordance with the condition of the car is required, which constitutes a source of the disturbances due to the rough operational conditions on a motor vehicle. In order to overcome the difficulties produced by an electric switch, the German OS 1,774,530 discloses an embodiment in which recording means are also connected by an elastic coupling with a vibratory pendulum whose disadvantages have been explained above.

SUMMARY OF THE INVENTION

It is an object of the invention to provide a recording device for graphically recording working times and conditions of the car in such a manner that, irrespective of whether the recording graphs are made in the form of stepped lines, or graphs, the recording means is automatically shifted between two recording positions, depending on the drive condition of the car for recording distinguishable graphs representing steering times.

Another object of the invention is to arrange the elements of the recording apparatus in a compact unit which requires little servicing, is not subject to disturbances, and does not cause heating of the apparatus.

With these objects in view, the present invention provides that the working times to be recorded are introduced as rotary speeds into a comparison transmission which includes a control means which is operatively connected with the recording means and places the same in different recording positions for producing the distinguishable graphs.

In a preferred embodiment of the invention, a first rotary input means is driven at a constant speed by an electromotor, and the second rotary input means is driven at a varying speed by measuring means responding to the distance of travel, or to the speed of travel of the motor car. In the preferred embodiment, the transmission includes an inner thread in a control gear driven from the constant speed motor, and a projecting stud on a shaft driven from the means which measure the distance of travel of the car. The stud meshes with the inner thread so that the control gear, which is mounted on the control shaft for axial and rotary movement can be moved against the action of springs to control positions in which the stud is located outside of the inner thread on one or the other side of the control gear.

The novel features which are considered as characteristic are set forth in particular in the appended claims. The invention itse,f however, both as to its construction and its method of operation, together with additional objects and advantages thereof, will be best understood from the following description of specific embodiments when read in connection with the accompanying drawings.

BRIEF DESCRIPTION OF THE DRAWING

FIG. 4 illustrates the cam slot and stepped cam follower used in the embodiment of FIG. 3, wherein FIG. 4a is a fragmentary sectional view illustrating one position of a cam plate, FIG. 4b is a sectional view illustrating another position of the cam plate, and FIG. 4c is a side elevation of the cam plate and stepped cam follower.

DESCRIPTION OF THE PREFERRED EMBODIMENTS

Figure 1:
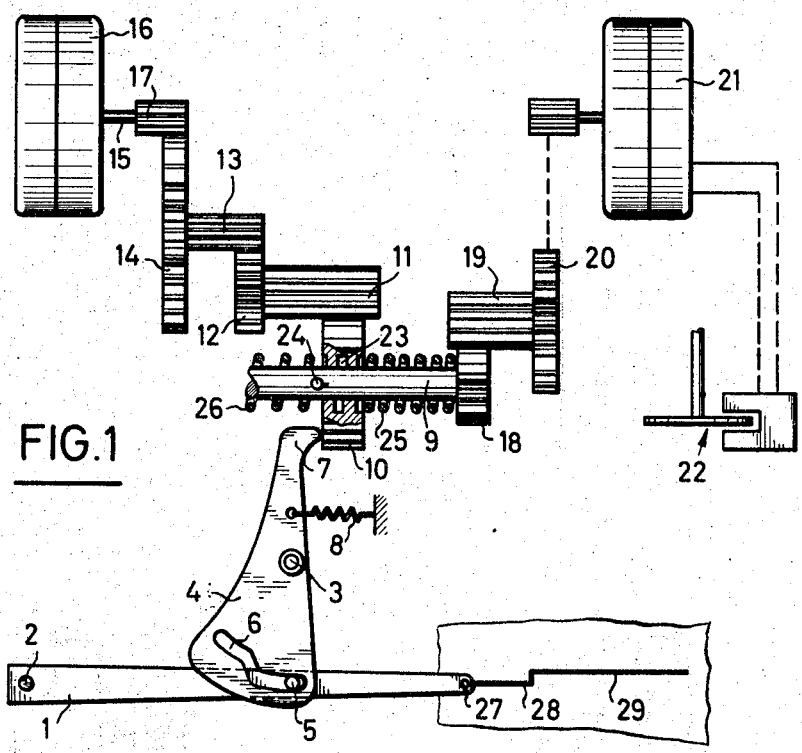
FIG. 1 is a schematic view illustrating a recording apparatus according to the invention in which the recording means records only two conditions of the car, namely driving and steering time, and standstill of the car, in the form of stepped lines.

Referring first to the arrangement shown in FIG. 1, a recording means 1 shown to be a recording arm with a point 27 and mounted for angular movement about a pivot 2, is movable between two recording positions for recording lines 28 and 29 on a recording surface moving at constant speed, and being preferably formed by a circular diagram sheet rotated by a clockwork.

A cam or cam plate 4 is mounted for angular movement on a stationary pivot 3, and has a stepped cam slot 6 in which a cam follower pin 5 of the recording arm 1 is located. A spring 8 urges the cam plate 4 to the illustrated condition, but when cam plate 4 is turned in counterclockwise direction, the cam follower 5 is located in a cam slot portion which is spaced a smaller distance from the pivot 3, so that the recording arm 1 is turned in counterclockwise direction to record the line graph 29. Cam plate 4 has a projection 7, abutting one side of a control gear 10, due to the action of a spring 8. The control gear 10 is mounted on a control shaft 9 for turning and axial movement and is biased by springs 25 and 26 to a normal position.

A control gear 10 is connected by a gear train 11, 12, 13, 14, and 17, and by a shaft 15, with a constant speed electromotor, which may be a direct current motor or synchronous motor.

A gear 18 is secured to shaft 9 and meshes with the gear 19 secured to a gear 20 which is connected by a gear train, schematically shown, with a measuring means 21 which measures the distance of travel of the car, or the speed of the car, responsive to electric pulses produced by a pulse generator 22, in accordance with the movement or standstill of the car. Pulse generator 22 is schematically shown to include a rotary disc producing pulses in a magnet, as is known to those skilled in the art.

Control gear 10 has a central bore with an inner thread 23, which is preferably a double-thread with a rectangular profile. A radially projecting stud 24 on control shaft 9 can be screwed into and out of the inner gear 23.

When control shaft 9 and control gear 10 rotate at the same rotary speed, the pin 24 meshes with the inner gear 23.

The first rotary input means 11 to 16 rotate control gear 10 at a constant speed, while the second rotary input means 18 to 22 rotate shaft 9 with pin 24 at a speed which varies with the distance of travel and the speed of the motor car.

Figure 2:
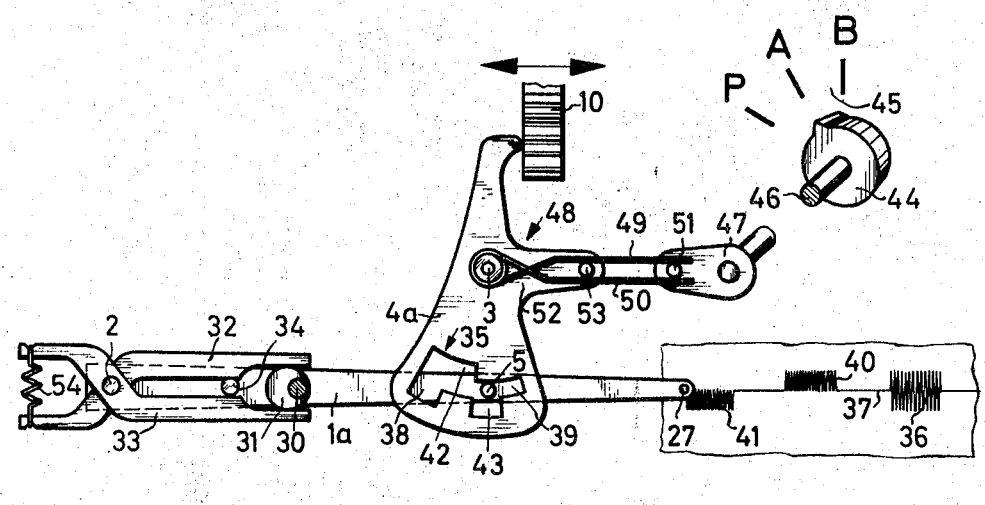
FIG. 2 is a schematic view illustrating a modified embodiment in which the recording means is oscillated for producing zig-zag portions of the recorded graph, and provided with manual means for setting the apparatus to make zig-zag recordings of working time and times of readiness of a driver, without influencing the automatic recording of standstill of the car by a line, and driving time of the car by a zig-zag recording.

When the car is at a standstill, the control shaft 9 also stops, and the first input means 11 to 16 rotate control gear 10 so that control gear 10 is screwed by the stopped pin 24 against the action of spring 25 towards the right of FIG. 2, until the pin 24 is located outside of the inner thread 23, as shown in FIG. 1. The lateral face of control gear 10 remains in a position abutting pin 24 due to the action of spring 25, irrespective of further turning of the control gear 10 on the control shaft 9.

When control gear 10 is placed in the position illustrated in FIG. 1, cam slot 6 places cam follower 5 in the illustrated position in which the recording point 27 makes the line recording 28 during movement of the record carrier. The stopped condition of the car is represented by the line 28, and the duration of this condition represented by the length of the line 28. When the car is started and moves, the second rotary input means 18 to 21 start driving the control shaft 9 with the projecting stud 24, while the control gear 10 is rotated by the first input means 11 to 16 at a constant speed. At a predetermined speed of the motor car, for example 25 km/h, shaft 9 with pin 23 turn sufficiently fast so that the inner thread 23 with control gear 10 is screwed along the shaft 9, to the right as viewed in FIG. 1, until pin 24 is located on the other side of control gear 10, disengaged from the inner thread 23, while spring 26 urges control gear 10 into abutment with pin 24.

In this second control position, not shown, the control cam 4 is turned in counterclockwise direction, out of the position shown in FIG. 1, so that cam follower 5 is located at the other end of cam slot 6, and recording arm 1 is turned to a position in which the recording point 27 records the line graph 29 on the surface of the moving record carrier, not shown. In this manner, the variable transmission 23, 24, is controlled by the first input means 11 to 16 and by the second input means 18 to 21 to place the control means 10, 4, 5 in two control positions for placing the recording means 1, 27 in two recording positions for making distinguishable line recordings 28, 29.

In the modified embodiment of FIG. 2, it is possible to record not only the standstill of the car and the driven condition of the car, but also the working time and the time of readiness of the driver. When the car is at a standstill, a straight line recording 37 is made, and when the car moves, a zig-zag recording forming a beam-shaped graph 36 is made automatically. Manual means 44 in the form of a knob on a shaft 46 are provided for setting the apparatus to a condition representing a pause in the work of the driver, a condition indicating the driver is working, and a condition in which the driver is available for work, as indicated by the indicia P—A—B.

In the condition P a straight line recording 37 is made, in the condition A a narrow zig-zag recording 41 is made, and in the condition B a narrow zig-zag recording 40 on the other side of the line 37 is made. The device is constructed in such a manner, that irrespective of the manual setting of the apparatus by the driver to condition P, A or B, the recording means 1, 27 will be automatically operated to make the zig-zag recording 36, instead of recordings 41, 40, or line recording 37, when movement of the car has started.

Recording means 1a, 27 is an arm mounted on a stationary pivot 2 for angular movement. A shaft 30, preferably driven at a constant speed by electromotor 16, described with reference to FIG. 1, carries an eccentric member 30 which is embraced by a pair of arms 32, 33 whose inner edges are engaged by a fixed stud 34 on recording arm 1a. A spring 54 connects the extensions of arms 32, 33, permitting yielding of the arms 32, 33 to the action of the eccentric member 31. The control cam plate 4a is operated by the control gear 10, as described above with reference to FIG. 1, but is provided with a cam slot 35 having four cam slot portions 39, 43, 42, 38 of different radial width, and spaced different distances from the pivot 3 of the control cam plate 4a. The movement of cam follower 5 due to oscillation of the recording arm 1a is differently limited by the cam slot portions 38, 42, 43, 39, and it is preferred to make the width of the cam slot portion 38 the greatest, so that a broad zig-zag recording 36 is obtained. Slot portions 42 and 43 are of the same width, but radially staggered to produce zig-zag recordings 40 and 41, respectively, representing working time and time of readiness of the driver. Slot portion 39 is so narrow that oscillation of the recording arm is prevented, and the recorded line 37 representing a pause in the operations, is made. While zig-zag recordings 40 and 41 are of equal width, the interpretation is possible due to the fact that zig-zag portions 40 and 41 are located on opposite sides of the base line formed by the recorded line 37.

The setting of the control cam plate 4a with the control cam slot 35 for making the zig-zag recordings 37, 40 and 41 is effected by the manual setting knob 44 with indicia 45 which represent the working time A, the condition of readiness of the driver B, and the pause P in the work of the driver.

A shaft 46 connects the turnable knob 44 with a lever 47 which has a stud 51 located between the legs 49 and 50 of a spring 48 which surrounds pivot 3 and embraces a stud 53 on the arm 52 of the control cam plate 4a.

When lever 47 is turned with knob 44 to the position P, the leg 49 of the spring 48 acts on stub 53 to turn control cam plate 4a corresponding to the turning of the knob 44 from the position A to the position P.

The distance of movement of control gear 10 between its control positions, in which pin 24 is located outside of the inner thread 23 of control lever 10, is dimensioned so that in any manually set position of the control cam slot 35, and particularly in the position P, the cam follower pin 5 cam be placed in the control cam portion 38.

The arms 32 and 33 which are operated by eccentric member 31 and embrace the stud 34 on the recording arm 1, are biased by spring 54 to the illustrated position. When the arm 33 is raised from the stud 34 by the action of the eccentric member 31, the arm 32 is urged by spring 55 to the follow the eccentric member 31, while the pin 34 and the recording arm 1a follow the movement. Such following is only possible if the control slot portion in which the pin 5 is located, permits a movement in this direction. If this is not the case, particularly in the position P, the arm 32 could not follow the eccentric member 31, since the stud 34 would be blocked by the edges of the slot portion 39. In this event, the spring 54 permits the relative movements of the parts.

Figure 3:
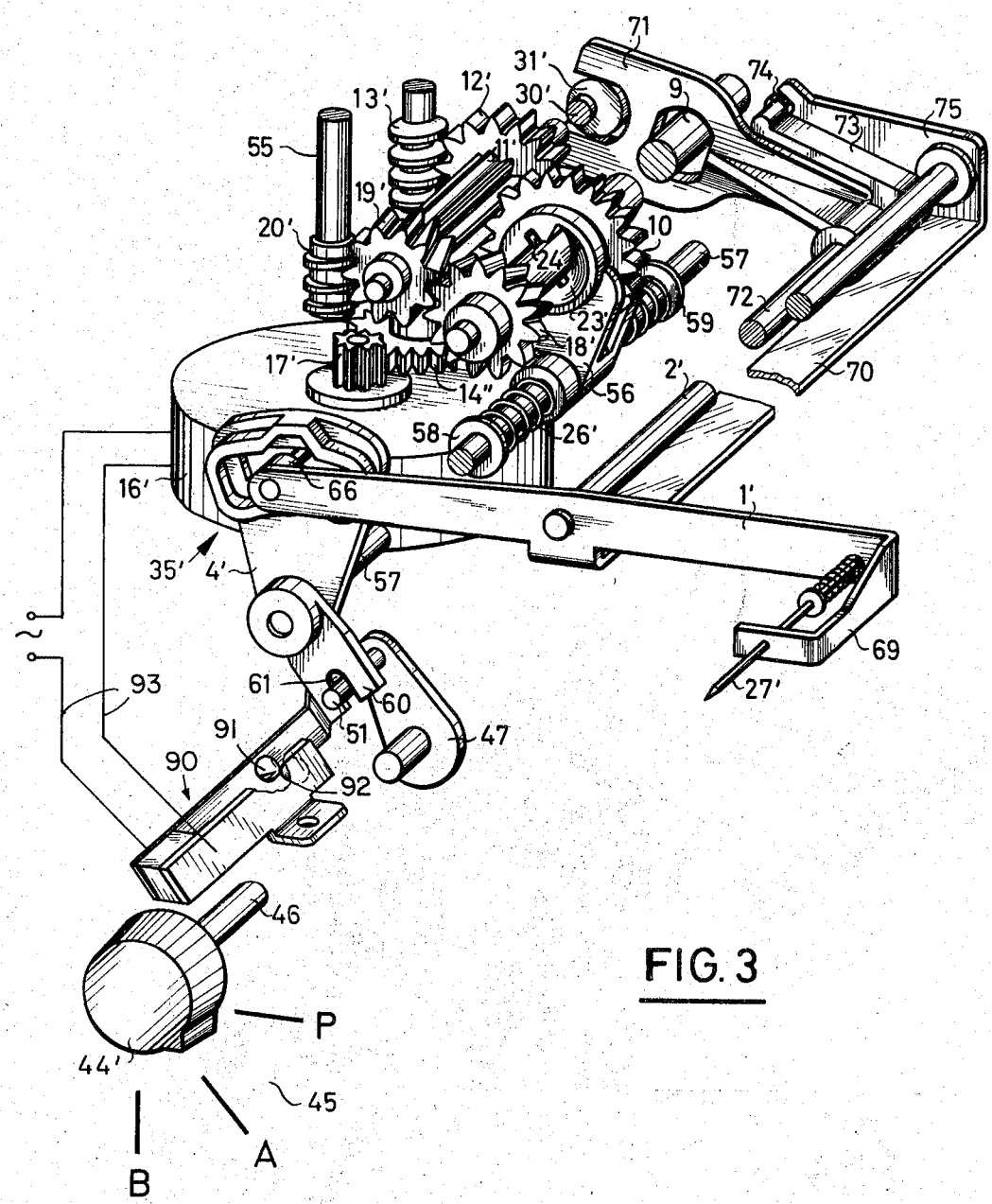
FIG. 3 is a perspective fragmentary view illustrating a preferred embodiment of the invention.
Figure 4:
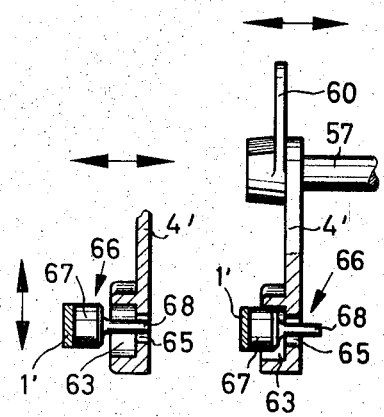
Figure 4:
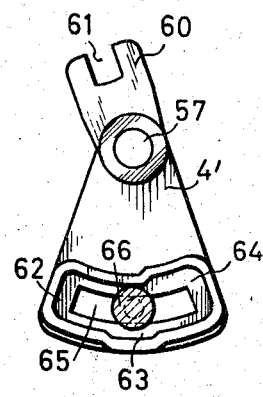

The preferred embodment of the invention shown in FIGS. 3 and 4, has first input means including electromotor 16', gears 17', 14', worm gears 13', and 12', and a gear 11' meshing with the control gear 10'. Worm gear 12' is secured with gear 11' to a shaft 30', which corresponds to shaft 30 of FIG. 2, and carries an eccentric member 31'. The second input means include a gear 18', meshing with a gear 19' which meshes with a gear 20' driven by a shaft 55 from measuring means 21, not shown, representing the distance travelled by the car. Gear 18' is secured to shaft 9' which carries the pin 24 meshing with the inner thread 23' in the control gear 10' and is connected by gears 18', 19' and 20' and shaft 55 with a measuring means 21. In the embodiment illustrated in FIG. 3, the gears 18', 19' and 20' are worm gears, and the gear 19' is rotatable on shaft 30', while gear 18' is fixed on shaft 9'. For transferring the setting movement of the control gear 10 to the control cam plate 4' a coupling member 56 is provided which is fork-shaped and embraces the control gear 10. Coupling member 56 is mounted on shaft 57 for axial movement, and urged by springs 25' and 26' to a normal position. To shaft 57, which is angularly movable and also mounted for limited axial movement, discs 58 and 59 are secured which serve as abutments for springs 25' and 26'. The end of shaft 57 is fixed to the control cam plate 4' which is provided with the control slots 35'. Control cam plate 4' has an arm 60 with a slot 61 embracing a pin 51' on lever 47' which is turned by a knob 44 through shaft 46'. By manual operation of knob 44, the control cam plate 4' can be placed in different positions representing working time, time of readiness, and a pause.

In the embodiment of FIGS. 3 and 4, the slot portion associated with the automatic recording of the movement of the motor car, which is slot portion 38 in FIG. 2, is not located in the same plane as the other slot portions. As best seen in FIGS. 4a, 4b and 4c, two parallel slot parts are provided, namely the slot part 63 and a parallel slot part 65. Accordingly, the follower 66 has a large diameter part 67 cooperating with the cam slot part 63, and a pin portion 68 cooperating with a slot part 65. The slot part 63 has three slot portions 62, 63, 64, see FIG. 4c corresponding to the settings, P, A, B which cooperate with the follower portion 67 of the recording arm 1', when the control cam plate 4' is shifted to the position shown in FIG. 4b. When the control cam plate 4' is shifted by shaft 57 to the position of FIG. 4a, the thin follower portion 68 cooperates with cam slot part 65 for limiting the zig-zag movement of the recording arm 1'.

In the cam slot arrangement shown in FIGS. 3 and 4 the distance of displacement and the time required for the shifting operation from one of the positions P,A,B, to the position recording the driven condition of the car, are very short, and the same from each of the positions, P, A, B. Due to the stepped shape of the follower pin 66, it can cooperate with all slot portions and parts 62 to 65. The slot part 65 has sufficient width to permit transverse movement of follower portion 68 while follower portion 67 cooperates with one of the slot portions 65, 63, 64.

Instead of the stepped follower 66, in the arrangement of the recording means 1' shown in FIG. 3, a stepped follower could be made intergral with the recording means 1, and be, for example a bent part thereof.

FIG. 3 shows also a switch 90. The contacts 91 and 92 are closed to connect the motor 16' through the conductors 93 to a source of current supply by tilting the lever 47 and axial movement of 57 and the contacts are opened when 44' is placed in position P and the car is at standstill.

FIG. 4a shows the device in a condition in which the oscillations of the recording means 1' are limited by engagement of the thin portion 65 of follower 66 with the edges of slot part 65. In the condition shown in FIG. 4b, the working time may be recorded, while the oscillations of the recording means 1' are limited by engagement of the follower portion 67 with the edges of slot portion 53.

In the embodiment of FIG. 3, the recording arm 1' has a U-shaped end portion in which the recording point 27' is mounted. Another bridge portion 17 connects the recording arm 1' with an arm 75 through which the pivot or shaft 2' also passes. Recording means 1' is oscillated by the fork-shaped member 71 which embraces eccentric member 31' and is pivotally mounted on a shaft 72, or on the shaft 2'. A resilient arm 73 connects the sleeve of member 71 surrounding shaft 72 with the end of arm 75, so that the oscillatory movement of recording means 1' can be limited by the edges of the control cam slots 35' engaging the follower 66.

Figure 5:
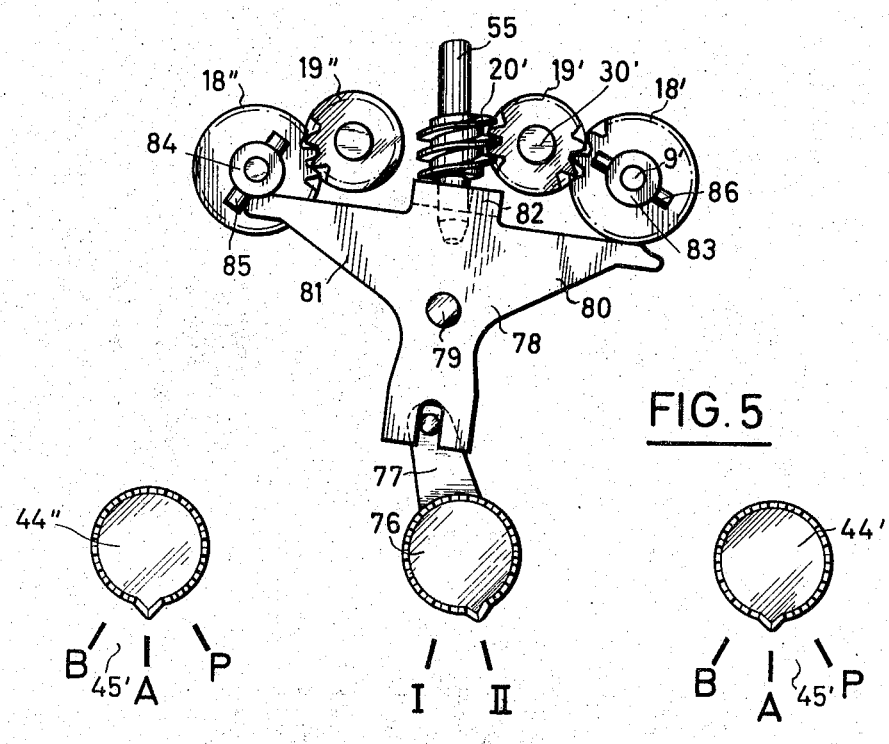
FIG. 5 is a schematic elevation illustrating shifting means for selectively operating two recording devices, associated with two drivers.

FIG. 5 shows the arrangement adapted to a situation in which in one motor car or truck, two drivers are used. Each of the drivers has a recording apparatus as decribed with reference to FIGS. 3 and 4, but the drive shaft 55 is common to the same measuring means 21, and a common motor 16' is also provided. The lever 71 has two spring arms 73 so that simultaneously two recording means can be operated.

A third manually operated knob 76 is provided which is operated before the start of each trip by the driver, which is on steering duty in the first shift. The manually operated knob 76 is connected by a lever arm 77 with a shifting member 78 which is mounted for angular movement on the stationary shaft 79, and has arms 80 and 81, and between the arms, a seat or bearing 82 for a free end portion of shaft 55, see also FIG. 3, which carries the gear 20', and is driven from the measuring means 21 which represents the distance travelled by the car or the speed of the car. When shifting member 78 is shifted between two positions, the gear 20' on shaft 55 meshes either with gear 19' or with gear 19''. In the two shifted positions of shifting member 78, either arm 80 or arm 81 cooperates with abutments 83 and 84, repectively, on the gears 18' and 78'' to assure the correct meshing depth between the gears 19', 19'' and gear 20'.

Gears 18', and 18'' have abutments 85, 86 cooperating with the arms 80 and 81 in such a manner that in the select position of the knob 76, the unused gears, which are not driven, are locked to prevent the unused gears from rotating due to friction forces acting in the bearings. Such frictional drive of the unused gears is possible, since both recording devices, which are only partly shown in FIG. 5, are always connected with the electromotor 16, independently of the second input from shaft 55. The drive for the second recording device is taken from a worm gear drive, corresponding to the worm gear drive 13', 12' shown in FIG. 3, so that the gear train between the electromotor 16 and the worm gear 13' serves both recording devices.

Under certain circumstances, for example, for saving the battery of the car, it can be advantageous to disconnect the electromotor 16', when the car is stopped, irrespective of its lower power consumption. However, disconnection of electromotor 16' is only possible in the position P, representing a pause, in the position A and B, zig-zag recordings have to be made.

The manner of recording according to the invention is suitable ffor the disconnection of the electromotor 16', since the recorded graph representing the position P, is a straight line, in contrast to the zig-zag recordings in the other positions. It is, however, necessary, that the electromotor 16 can be shifted from the position P not only by a manual operation to the positions A and B, but also upon start of the car to the position in which steering or driving is recorded in the form of the zig-zag recording 36. Such an operation can be obtained in a simple manner by switch means in the circuit of electromotor 16 which is connected with a control cam plate 4' during standstill of the car, and also in the position P, and in such a manner, that axial shifting and turning of the control cam plate 4' effects operation of the switch means to energize the electromotor 16.

It will be understood that each of the elements described above, or two or more together, may also find a useful application in other types of apparatus for recording operational conditions of a motor car, differing from the types described above.

While the invention has been illustrated and described as embodied in a recording apparatus in which the standstill and the driven conditions of the car are automatically recorded in the form of distinguishable graphs, preferably including broad zig-zag recordings, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. Apparatus for recording operational conditions of a motorcar, comprising a comparison device including first rotary input means comprising a motor rotating in only one direction and at a constant speed, secondary rotary input means rotating at a varying speed depending on the condition of the motorcar, control means including a movable member movable between first and second control positions, and transmission means connecting said first and said second rotary input means with said control means for placing said control member in said first and second control positions when said second rotary input means operates for selected time periods above and below a predetermined speed, respectively; and recording means and a recording surface movable relative to each other, said recording means being connected with said control member and placed in first and second recording positions by said control member in said first and second control positions, respectively, for automatically recording on said recording surface first and second graphs representing first and second time periods during which said motorcar operates in different operational conditions, respectively.

2. Apparatus as claimed in claim 1 comprising means for oscillating said recording means at least in said second recording position so that said second graph is a zig-zag line.

3. Apparatus as claimed in claim 1, wherein said second rotary input means includes measuring means for at least the distance of travel of the motor car.

4. Apparatus as claimed in claim 1 wherein said control means further includes cam means operated by said control member between said first and second control positions, and a cam follower on said recording means cooperating with said cam means for moving said recording means between said first and second recording positions; and wherein said recording means is pivotally mounted for angular movement between said first and second recording positions.

5. Apparatus as claimed in claim 1 wherein said transmission means includes threaded means.

6. Apparatus as claimed in claim 1 comprising an eccentric member driven by said motor, a fork-shaped member embracing said eccentric member, and resilient means connecting said fork-shaped member with said recording means so that said recording means is oscillated to form a zig-zag recording on said surface.

7. Apparatus for recording operational conditions of a motorcar, comprising a comparison device including first rotary input means, second rotary input means rotating at a varying speed depending on the condition of the motorcar, control means movable between first and second control positions, and transmission means connecting said first and said second rotary input means with said control means so that said control means is placed in said first and second control positions when said second rotary input means operates for selected time periods above and below a predetermined speed, respectively, said control means including a control member operated by said transmission means between two end positions, cam means operated by said control member between said first and second positions, and a cam follower, said cam means including a stepped cam slot in which said follower is located; recording means and a recording surface, said cam follower being mounted on said recording means and cooperating with said cam means for moving said recording means between first and second recording positions when said control means is in said first and second control positions, respectively, for automatically recording on said recording surface first and second graphs respectively representing first and second time periods during which said motorcar operates in different operational conditions, said recording means being pivotally mounted for angular movement between said first and second recording positions; means for oscillating said recording means at least in said second recording position so that said second graph is a zig-zag line, said stepped cam slot having first and second slot portions for holding said recording means in said first and second recording positions; and manual means for moving said cam means to other positions in which said cam follower is located in other slot portions of said cam slot for making other zig-zag recordings, said control member moving in said second control position said cam means to a position in which said cam follower moves out of said other slot portions and into said second slot portion.

8. Apparatus as claimed in claim 7 wherein said second slot portion has a width corresponding to the transverse displacement of said cam follower during oscillation.

9. Apparatus as claimed in claim 7 comprising means mounting said cam means for angular movement about an axis between said other positions, and for axial movement; wherein said cam slot includes two axially spaced slot parts; wherein said cam follower has two axially spaced follower portions respectively cooperating with said slot parts when said cam means is axially shifted by said control member, one of said slot parts having said first and said other slot portions, and the other slot part having said second slot portion.

10. Apparatus as claimed in claim 9 wherein said cam means includes a plate having said stepped cam slot; wherein said control means includes a shaft secured to said cam plate, and being mounted for axial movement with said cam plate, and a coupling secured to said shaft and being coupled with said control member for axial movement so that axial displacement of said control member by said transmission effects axial shifting of said cam means between positions in which said cam follower cooperates with different slot parts.

11. Apparatus as claimed in claim 9 wherein said first rotary input means includes an electric motor, and a switch in the electric circuit of said electric motor; and wherein said switch is operated when said cam means is moved about said axis and along said axis.

12. Apparatus for recording operational conditions of a motorcar, comprising a comparison device including first rotary input means, second rotary input means rotating at a varying speed depending on the condition of the motorcar, control means movable between first and second control positions and including a control member driven from said first input means, and transmission means connecting said first and second rotary input means with said control means so that the latter is placed in said first and second control positions when said second rotary input means operates for selected time periods above and below a predetermined speed, respectively, said transmission means including a bore with an inner thread and a control shaft, driven from said second rotary input means, located in said bore and having a projecting stud meshing with said inner thread so that said control member moves between two control positions in which said stud is located outside of said bore on opposite sides of said control member; spring means biasing the control member against movement to said two control positions and into abutment with said stud; and recording means and a recording surface movable relative to each other, said recording means being connnected with said control means and placed in first and second recording positions when said control means is in said first and second control positions, respectively, for automatically recording on said recording surface first and second graphs representing first and second time periods during which said motorcar operates in different operational conditions, respectively.

13. Apparatus as claimed in claim 12 wherein said inner thread is a flat double thread.

14. Apparatus as claimed in claim 12 wherein said control member is a control gear mounted on said control shaft for axial movement; wherein said first rotary input means includes a constant speed electromotor and a gear meshing with said control gear; wherein said second rotary input means includes measuring means for at least the distance of travel of the motor car, and another rotary member connected with said control shaft for rotation.

15. Apparatus as claimed in claim 14 wherein said control means include a cam having first and second control positions, and a fork-shaped coupling means embracing said control gear and being connected with said cam for movement so that said recording means is moved between said first and second recording positions when said control gear is moved in axial direction by said transmission means.

16. Apparatus for recording operational conditions of a motorcar, comprising a comparison device including first rotary input means comprising an electric motor, second rotary input means rotating at varying speeds depending on the condition of the motorcar, control means movable between first and second control positions, and transmission means connecting said first and second rotary input means with said control means so that the latter is placed in first and second control positions when said second rotary input means operates for selected time periods above and below a predetermined speed, respectively; recording means and a recording surface movable relative to each other, said recording means including an arm and being connected with said control means and placed in first and second recording positions by said control means in said first and second control positions, respectively, for aautomatically recording on said recording surface first and second graphs respectively representing first and second time periods during which said car operates in different operating conditions; an eccentric member driven by said motor; a fork-shaped member embracing said eccentric member; and a spring arm connecting said fork-shaped member with said arm of said recording means so that said recording means is oscillated to form a zig-zag recording on said recording surface, said spring arm being adapted to be connected with a corresponding arm of the recording means of another recording apparatus.

17. Apparatus as claimed in claim 16 wherein said other recording apparatus comprises another comparison device having other second input means; measuring means for at least the distance of travel of said motor car; and shifting means for connecting said measuring means selectively with said second input means and with said other second input means.

18. Apparatus as claimed in claim 16 comprising locking means controlled by said shifting means for automatically locking the comparison device whose second input means is not connected with said measuring means.

* * * * *